United States Patent
Keene et al.

(10) Patent No.: US 12,492,774 B2
(45) Date of Patent: Dec. 9, 2025

(54) CONNECTOR FOR MAINLINE PIPE AND OUTLET PIPE

(71) Applicant: Advanced Drainage Systems, Inc., Hilliard, OH (US)

(72) Inventors: Kurt Michael Keene, Phoenix, AZ (US); Jeffrey Allan Warden, Lafayette, OR (US); Joseph Michael Halter, Beaverton, OR (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 459 days.

(21) Appl. No.: 17/330,527

(22) Filed: May 26, 2021

(65) Prior Publication Data
US 2021/0372552 A1    Dec. 2, 2021

Related U.S. Application Data

(60) Provisional application No. 63/031,387, filed on May 28, 2020.

(51) Int. Cl.
*F16L 41/12*     (2006.01)
*E03F 5/02*      (2006.01)
(Continued)

(52) U.S. Cl.
CPC ............. *F16L 41/06* (2013.01); *F16L 41/088* (2013.01); *F16L 41/12* (2013.01); *E03F 5/021* (2013.01)

(58) Field of Classification Search
CPC ......... F16L 41/14; F16L 41/04; F16L 41/088; F16L 41/06; F16L 41/065; F16L 47/28;
(Continued)

(56) References Cited

U.S. PATENT DOCUMENTS 2,137,223 A * 11/1938 Baxter .................... F16L 41/14
                                                      285/200
3,423,518 A *  1/1969 Weagant ............... H02G 3/088
                                                      174/DIG. 8
(Continued)

FOREIGN PATENT DOCUMENTS

CA    2246046 A1    3/2000
DE    2340792 A1 *  2/1974
(Continued)

OTHER PUBLICATIONS

DE-4014684 Translation (Year: 1990).*
(Continued)

*Primary Examiner* — Zachary T Dragicevich
*Assistant Examiner* — Alexander T Rufrano
(74) *Attorney, Agent, or Firm* — FINNEGAN, HENDERSON, FARABOW, GARRETT & DUNNER L.L.P.

(57) ABSTRACT

A system for connecting a mainline pipe with an outlet pipe is provided. The system comprises an outlet pipe configured to be coupled to a mainline pipe near a proximal end of the outlet pipe, a first sleeve disposed on an exterior surface of the outlet pipe and comprising a first lip at a proximal end of the first sleeve, and a second sleeve disposed on the first sleeve and comprising a second lip at a proximal end of the second sleeve. The first lip of the first sleeve may be configured to abut an interior surface of the mainline pipe, and the second lip of the second sleeve may be configured to abut an exterior surface of the mainline pipe.

19 Claims, 6 Drawing Sheets

(51) Int. Cl.
    *F16L 41/06*     (2006.01)
    *F16L 41/08*     (2006.01)

(58) Field of Classification Search
    CPC ......... F16L 47/30; F16L 47/34; F16L 47/345;
                                              F16L 37/008
    See application file for complete search history.

(56) References Cited

U.S. PATENT DOCUMENTS

| | | | | |
|---|---|---|---|---|
| 4,441,744 | A * | 4/1984 | Oostenbrink | F16L 37/008 277/621 |
| 5,129,684 | A * | 7/1992 | Lawrence | F16L 5/06 285/236 |
| 5,145,216 | A * | 9/1992 | Valls, Jr. | F16L 41/004 5/205 |
| 5,704,656 | A * | 1/1998 | Rowe | F16L 5/02 285/302 |
| 7,644,735 | B2 * | 1/2010 | Belford | A01G 25/023 138/92 |
| 7,677,603 | B2 * | 3/2010 | Happel | F16L 5/06 285/139.2 |
| 8,196,968 | B2 * | 6/2012 | Kief | F16L 41/088 285/204 |
| 8,511,715 | B2 * | 8/2013 | McCann | F16L 41/14 285/139.2 |
| 2008/0303270 | A1 | 12/2008 | Kief et al. | |

FOREIGN PATENT DOCUMENTS

| | | | | |
|---|---|---|---|---|
| DE | 4014684 | A1 * | 9/1990 | ............ F16L 41/088 |
| DE | 102004056950 | B3 * | 8/2006 | .............. F16L 41/08 |
| EP | 0192524 | A1 * | 8/1986 | ............ F16L 37/008 |
| EP | 0913619 | A1 * | 5/1999 | .............. F16L 41/14 |
| EP | 0975914 | A1 | 2/2000 | |
| EP | 0975914 | B1 * | 6/2002 | |
| EP | 2754763 | A1 | 7/2014 | |
| EP | 2754763 | B1 * | 6/2017 | ................ E03F 3/04 |
| EP | 3486596 | B1 * | 9/2018 | ............ F16L 37/008 |
| EP | 3486596 | A | 5/2019 | |
| FR | 2518699 | A2 * | 6/1983 | |
| GB | 1313069 | A * | 4/1973 | |
| GB | 2120340 | A | 11/1983 | |
| JP | H10176785 | | * 6/1998 | |
| JP | H11158985 | | * 6/1999 | ............. F16L 41/06 |
| KR | 200159690 | Y1 * | 11/1999 | |
| KR | 20080040817 | A * | 5/2008 | |
| WO | WO 99/31428 | A1 | 6/1999 | |

OTHER PUBLICATIONS

JP-H11158985 Translation (Year: 1999).*
Soleno, Soleno Catalog, Universal Sol Tee, May 2016 (p. 43 of 273).
International Search Report and Written Opinion for International Application No. PCT/2021/034135, dated Sep. 21, 2021 (14 pages).

* cited by examiner

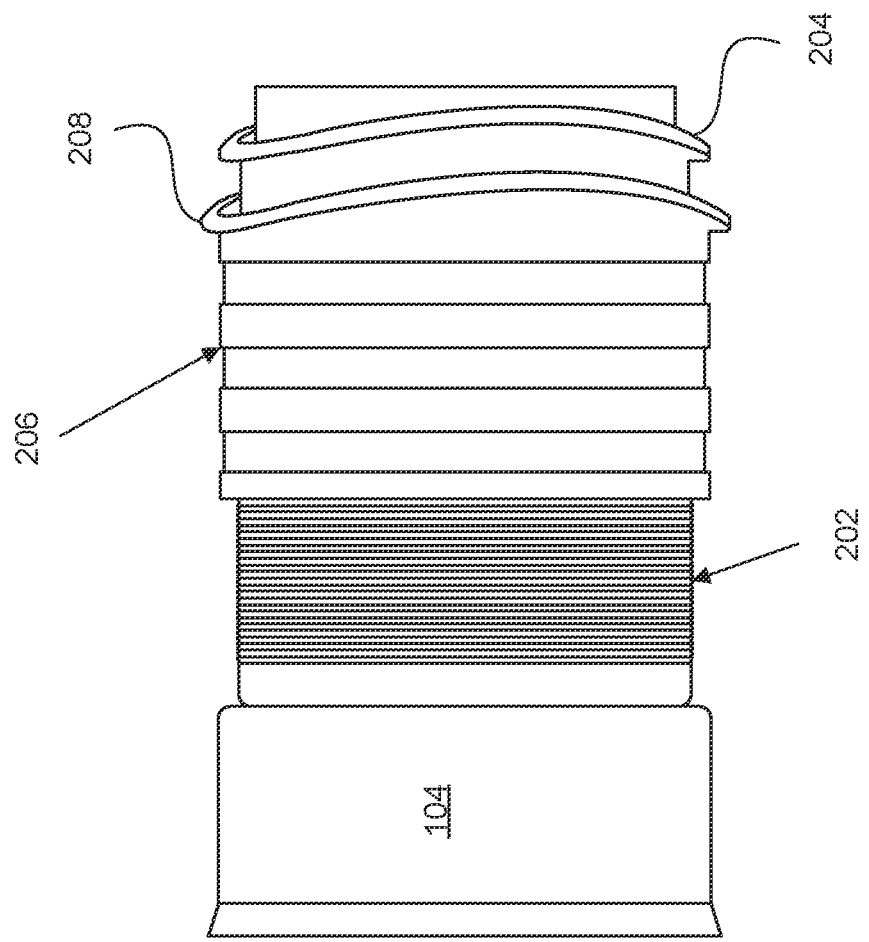

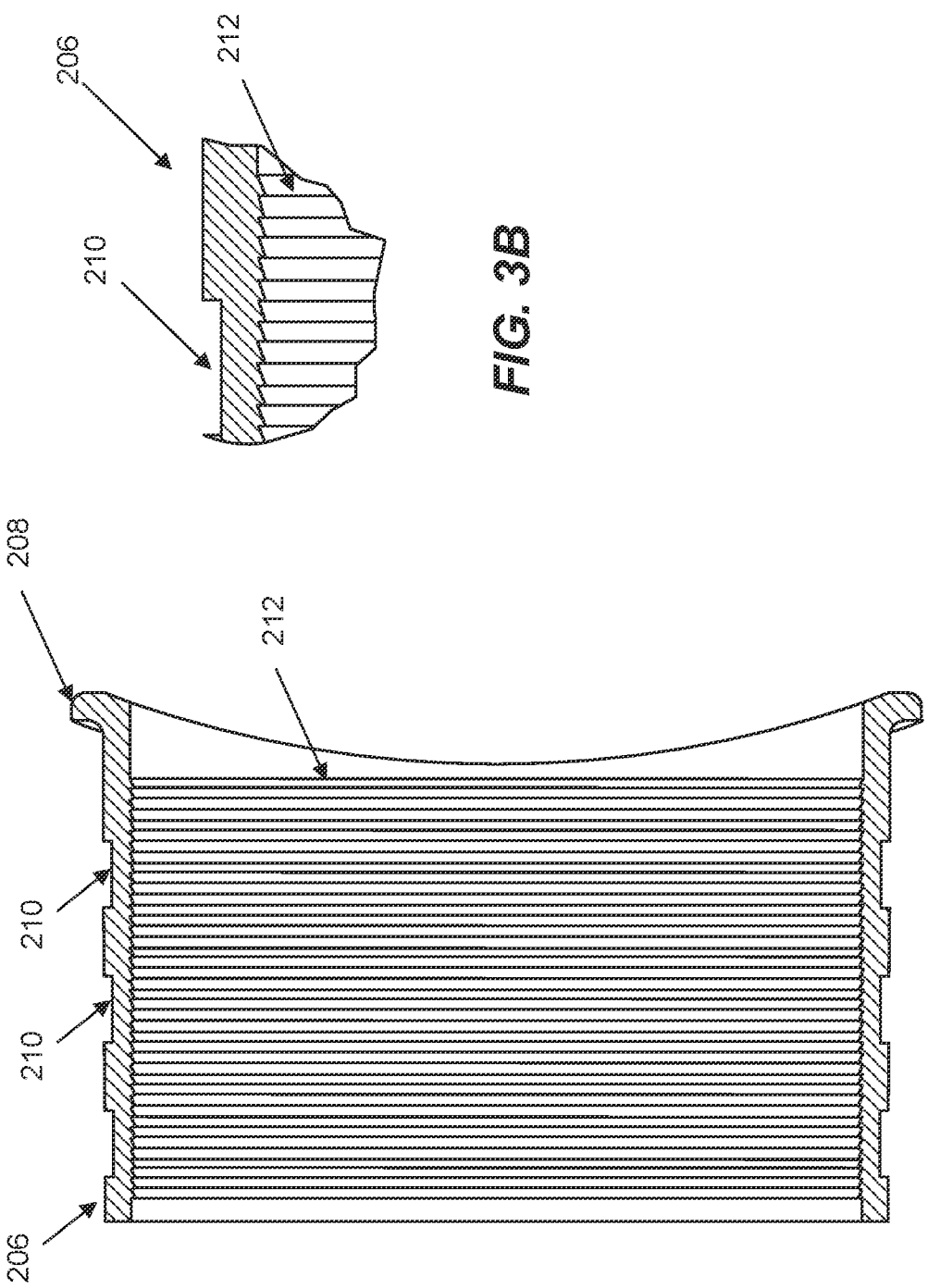

CONNECTOR FOR MAINLINE PIPE AND OUTLET PIPE

CROSS-REFERENCE TO RELATED APPLICATIONS

This application claims the benefit of U.S. Provisional Application No. 63/031,387, filed May 28, 2020, entitled "Connector for Mainline Pipe and Outlet Pipe," which is hereby incorporated by reference in its entirety.

TECHNICAL FIELD

This disclosure relates generally to connectors for stormwater and sanitary sewer management systems, and more particularly, to connectors for stormwater and sanitary sewer management systems having a mainline pipe with an outlet pipe.

BACKGROUND

Water management systems, such as stormwater and sanitary sewer management systems, are used to manage and control water, for example, by providing chambers for retention or detention of water. As such, chambers may be provided underground where the chambers capture, filter, and/or contain the water until it is deposited in the ground or in an off-site location. Such systems typically comprise underground pipes that must be brought to the surface by, for example, vertically extending outlet pipes. Outlet pipes vertically feed the surface drainage into underground pipes.

Conventional water management systems, however, have poor connection between the underground pipes and the outlet pipes extending from the underground pipes to the surface. Accordingly, due to the poor connection between the underground mainline pipes and the outlet pipes, fluid typically leaks out of the pipes. As such, conventional water management systems are incapable of completely capturing and retaining the fluid until it is later deposited.

Therefore, there is a need for an improved water management system that is capable of securely connecting the underground mainline pipes and the outlet pipes that extend from the mainline pipes. There is also a need for an improved water management system that can securely connect the underground mainline pipes and the outlet pipes so as to prevent fluid from leaking out of the pipes due to faulty connection.

SUMMARY

Embodiments of the present disclosure may include a system for connecting a mainline pipe with an outlet pipe. The system may comprise an outlet pipe configured to be coupled to a mainline pipe near a proximal end of the outlet pipe, a first sleeve disposed on an exterior surface of the outlet pipe and comprising a first lip at a proximal end of the first sleeve, and a second sleeve disposed on the first sleeve and comprising a second lip at a proximal end of the second sleeve. The first lip of the first sleeve may be configured to abut an interior surface of the mainline pipe, and the second lip of the second sleeve may be configured to abut an exterior surface of the mainline pipe.

In some embodiments, an exterior surface of the second sleeve may comprise at least one recess, and the recess may be configured to accommodate at least a portion of a fastener. In other embodiments, the fastener may comprise at least one of a non-adjustable band, an adjustable band, a ratcheting band, a zip tie, or a clinch band. Additionally, or alternatively, an exterior surface of the first sleeve may comprise a plurality of ridges, an interior surface of the second sleeve may comprise a plurality of ridges, and the ridges of the first sleeve and the ridges of the second sleeve may be configured to interact with each other to inhibit movement between the first sleeve and the second sleeve. In some embodiments, the plurality of ridges on the exterior surface of the first sleeve and the plurality of ridges on the interior surface of the second sleeve may comprise at least one of lateral ridges extending circumferentially around the exterior surface of the first sleeve and the interior surface of the second sleeve or longitudinal ridges extending longitudinally along the exterior surface of the first sleeve and the interior surface of the second sleeve. In other embodiments, the ridges of the first sleeve and the ridges of the second sleeve may be configured to interact with each other to inhibit movement along at least one of a longitudinal axis or a vertical axis between the first sleeve and the second sleeve.

In some embodiments, the first lip may comprise a curvature that corresponds to a curvature of the interior surface of the mainline pipe. In yet another embodiment, the second lip may comprise a curvature that corresponds to a curvature of the exterior surface of the mainline pipe. Additionally, or alternatively, an inner diameter of the second sleeve may be greater than an outer diameter of the first sleeve such that a gap is formed between the first sleeve and the second sleeve when the second sleeve is disposed on the first sleeve. In some embodiments, the gap may be about 0.1 inches wide. In some embodiments, the system may further comprise a gap between an interior surface of the first sleeve and the exterior surface of the outlet pipe when the first sleeve is disposed on the exterior surface of the outlet pipe. In other embodiments, the outlet pipe may be configured to extend past both ends of the first sleeve. In yet another embodiment, the outlet pipe may be configured to extend past only a distal end of the first sleeve.

According to another embodiment of the present disclosure, a system for connecting a mainline pipe with an outlet pipe is provided. The system may comprise an outlet pipe configured to be coupled to a mainline pipe near a proximal end of the outlet pipe, a first sleeve disposed on an exterior surface of the outlet pipe and comprising a first lip at a proximal end of the first sleeve, and a second sleeve disposed on the first sleeve and comprising a second lip at a proximal end of the second sleeve. The first lip of the first sleeve may be configured to abut an interior surface of the mainline pipe, and the second lip of the second sleeve may be configured to abut an exterior surface of the mainline pipe. In addition, an exterior surface of the second sleeve may comprise at least one recess being configured to accommodate at least a portion of a fastener, an exterior surface of the first sleeve may comprise a plurality of ridges, an interior surface of the second sleeve may comprise a plurality of ridges, and the ridges of the first sleeve and the ridges of the second sleeve may be configured to interact with each other to inhibit movement between the first sleeve and the second sleeve.

In some embodiments, the plurality of ridges on the exterior surface of the first sleeve and the plurality of ridges on the interior surface of the second sleeve may comprise at least one of lateral ridges extending circumferentially around the exterior surface of the first sleeve and the interior surface of the second sleeve or longitudinal ridges extending longitudinally along the exterior surface of the first sleeve and the interior surface of the second sleeve. In some embodiments, the ridges of the first sleeve and the ridges of the second sleeve may be configured to interact with each other to inhibit movement along at least one of a longitudinal axis or a vertical axis between the first sleeve and the second sleeve.

In some embodiments, the first lip may comprise a curvature that corresponds to a curvature of the interior surface of the mainline pipe. In yet another embodiment, the second lip may comprise a curvature that corresponds to a curvature of the exterior surface of the mainline pipe. In other embodiments, an inner diameter of the second sleeve may be greater than an outer diameter of the first sleeve such that a gap is formed between the first sleeve and the second sleeve when the second sleeve is disposed on the first sleeve. In some embodiments, the system may further comprise a gap between an interior surface of the first sleeve and the exterior surface of the outlet pipe when the first sleeve is disposed on the exterior surface of the outlet pipe.

BRIEF DESCRIPTION OF THE DRAWINGS

The accompanying drawings, which are incorporated into and constitute a part of this specification, illustrate disclosed embodiments and, together with the description, serve to explain the disclosed embodiments.

FIG. 2A is an illustration of an exemplary outlet pipe, consistent with the embodiments of the present disclosure;

FIG. 3A is an illustration of an exemplary outer sleeve, consistent with the embodiments of the present disclosure;

FIG. 3B is another illustration of a portion of the exemplary outer sleeve of FIG. 3A, consistent with the embodiments of the present disclosure;

DETAILED DESCRIPTION

Reference will now be made in detail to the present embodiments (exemplary embodiments) of the disclosure, examples of which are illustrated in the accompanying drawings.

As discussed in further detail below, various embodiments of systems for connecting mainline pipes and outlet pipes of water management systems are provided. The systems, consistent with the embodiments of the present disclosure, may be able to securely connect the mainline pipes and the outlet pipes so as to prevent any fluid from leaking out of the pipes. In some embodiments, the systems for connecting the mainline pipes and the outlet pipes may comprise a first sleeve disposed on an outlet pipe and a second sleeve disposed on the first sleeve. The first and second sleeves, for example, may interact with each other to inhibit movement between the sleeves.

The systems for connecting mainline pipes to outlet pipes, consistent with the embodiments of the present disclosure, may also comprise a lip on the first sleeve and a lip on the second sleeve. The lip on the first sleeve may abut an interior surface of the mainline pipe, and the lip on the second sleeve may abut an exterior surface of the mainline pipe so as to securely fasten the outlet pipe to the mainline pipe. Additionally, or alternatively, the systems for connecting mainline pipes to outlet pipes may comprise a recess on an exterior surface of the second sleeve that is configured to accommodate a fastener. In some embodiments, the fastener may comprise a non-adjustable band, an adjustable band, a ratcheting band, a zip tie, and/or a clinch band.

Figure 1:
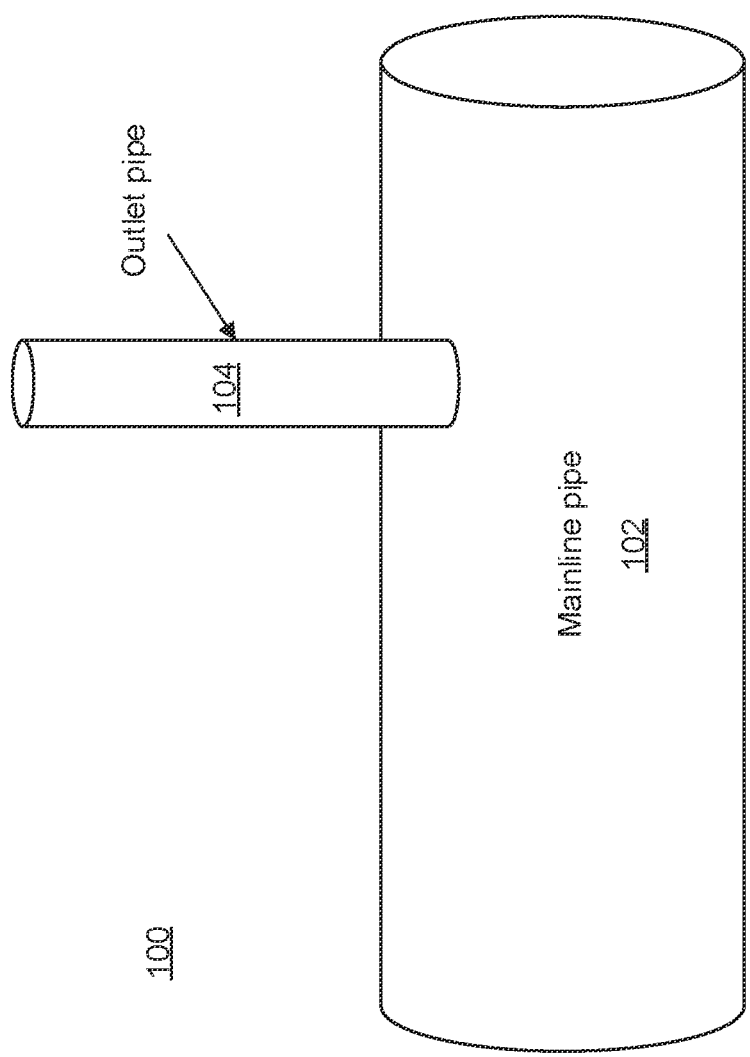
FIG. 1 is an illustration of an exemplary system for connecting a mainline pipe with an outlet pipe, consistent with the embodiments of the present disclosure.

Turning now to the drawings, FIG. 1 illustrates an exemplary system 100 for connecting a mainline pipe 102 with an outlet pipe 104 according to an embodiment of the present disclosure. In the illustrated embodiment, system 100 may comprise, for example, a water management system, such as a stormwater and sanitary sewer management system. As illustrated in FIG. 1, one end of outlet pipe 104 may be detachably coupled to mainline pipe 102, and another end of outlet pipe 104 may extend vertically upward toward a surface. Accordingly, surface drainage, may flow down and through outlet pipe 104, through mainline pipe 102, and/or through various underground pipes to be deposited in the ground or in an off-site location.

Figure 2B:
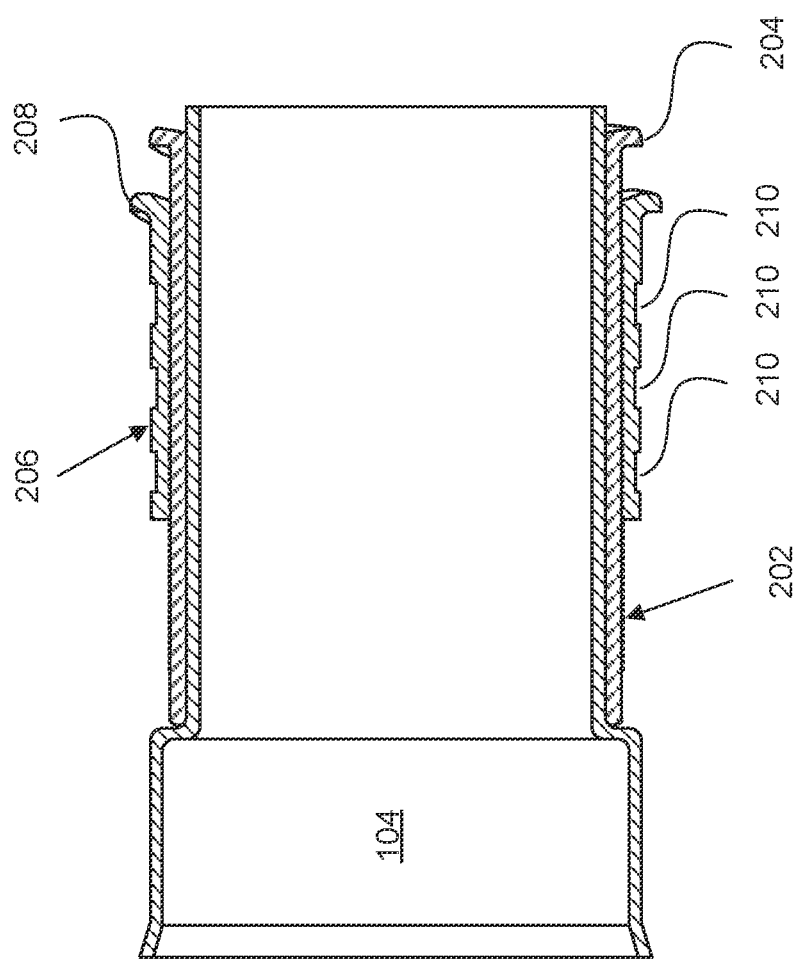
FIG. 2B is an illustration of a cross-sectional view of the exemplary outlet pipe of FIG. 2A, consistent with the embodiments of the present disclosure.
Figure 2C:
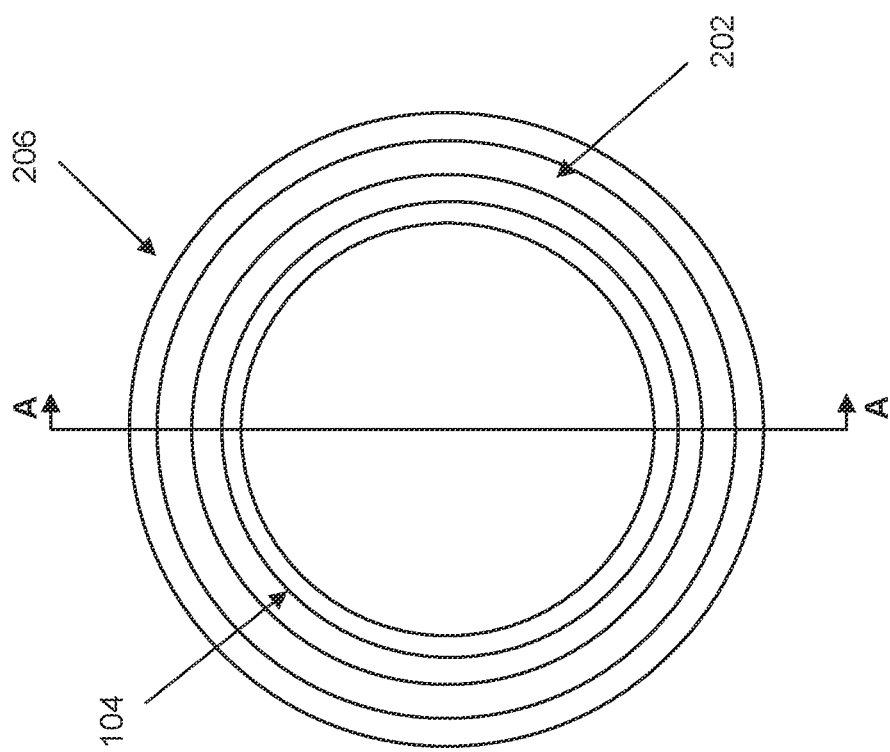
FIG. 2C is an illustration of another cross-sectional view of the exemplary outlet pipe of FIG. 2A, consistent with the embodiments of the present disclosure.

As discussed above, outlet pipe 104 may need to be securely connected to mainline pipe 102 in order to prevent surface drainage or fluid from leaking out of system 100. FIGS. 2A-2C illustrate an exemplary outlet pipe 104, consistent with the embodiments of the present disclosure. As illustrated in FIGS. 2A-2C, outlet pipe 104 may comprise a first sleeve 202 and a second sleeve 206. First sleeve 202 may be disposed on an exterior surface of outlet pipe 104. In some embodiments, first sleeve 202 may be disposed on outlet pipe 104 such that first sleeve 202 surrounds a portion of outlet pipe 104 proximate to a mainline pipe, such as mainline pipe 102 of FIG. 1. For example, outlet pipe 104 may be coupled to a mainline pipe near a proximal end of outlet pipe 104, and first sleeve 202 may be configured to surround a portion of the proximal end of outlet pipe 104. As illustrated in FIGS. 2A and 2B, outlet pipe 104 may be configured to extend through both ends of first sleeve 202. In other embodiments, outlet pipe 104 may extend through only one end, such as a distal end, of first sleeve 202. For example, outlet pipe 104 may extend through a distal end of first sleeve 202 and may not extend through a proximal end of first sleeve 202 that is proximate to a mainline pipe, such as mainline pipe 102 of FIG. 1.

In some embodiments, outlet pipe 104 may comprise an inner diameter and an outer diameter in the range of about 5 inches to about 10 inches. For example, outlet pipe 104 may comprise an inner diameter and an outer diameter of about 6 inches. Additionally, or alternatively, first sleeve 202 may comprise an inner diameter in the range of about 5 inches to about 10 inches and an outer diameter of about 6 inches to about 12 inches. For example, first sleeve 202 may comprise an inner diameter of about 6.5 inches and an outer diameter of about 7 inches. Accordingly, first sleeve 202 may comprise a thickness of about 0.5 inches.

In some embodiments, first sleeve 202 may be made of or may comprise materials, such as styrene-butadiene rubber (SBR), ethylene propylene diene monomer (EDPM) rubber, or Nitrile rubber. In some embodiments, first sleeve 202 may be sized to accommodate outlet pipe 104. Outlet pipe 104 may have an external diameter in the range of about 2 inches to about 10 inches. For example, outlet pipe 104 may have an external diameter in the range of about 4 inches to about 8 inches, and first sleeve 202 may be sized to accommodate outlet pipe 104 with such an external diameter. In other embodiments, first sleeve 202 may comprise a wall thickness in the range of about ⅛ inches to about ⅝ inches. For example, first sleeve 202 may comprise a wall thickness of about 0.5 inches. Additionally, or alternatively, first sleeve 202 may comprise a length in the range of about 5 inches to about 15 inches. For example, first sleeve 202 may comprise a length in the range of about 8 inches to about 10 inches.

In some embodiments, an inner diameter of first sleeve 202 may be greater than an outer diameter of outlet pipe 104. Accordingly, when first sleeve 202 is disposed on an exterior surface of outlet pipe 104 and covers a portion of outlet pipe 104, there may be a gap in the range of about 0.0001 inches to about 0.1 inches between the internal surface of first sleeve 202 and the exterior surface of outlet pipe 104. For example, the gap between the internal surface of first sleeve 202 and the exterior surface of outlet pipe 104 may be about 0.01 inches. In some embodiments, additional materials may be used to facilitate sliding first sleeve 202 over outlet pipe 104. For example, soap or other solutions may be used to facilitate sliding first sleeve 202 over outlet pipe 104. In other embodiments, one or more materials may be used to facilitate securing first sleeve 202 to outlet pipe 104. For example, a pipe lubricant or other types of lubricants may be disposed between first sleeve 202 and outlet pipe 104 in order to facilitate securing first sleeve 202 to outlet pipe 104. In yet another embodiment, first sleeve 202 may be secured to outlet pipe 104 by mechanical means. For example, a fastener may be used to secure first sleeve 202 to outlet pipe 104. In some embodiments, a fastener, such as a non-adjustable band, an adjustable band, a ratcheting band, a zip tie, a clinch band, or any combination thereof may be used to secure first sleeve 202 to outlet pipe 104. In some embodiments, a fastener may encompass both second sleeve 206 and first sleeve 202, thereby securing both sleeves to outlet pipe 104.

In some embodiments, first sleeve 202 may comprise a first lip 204 at a proximal end of first sleeve 202. When first sleeve 202 is disposed on outlet pipe 104 and outlet pipe 104 is connected to a mainline pipe, such as mainline pipe 102 of FIG. 1, first lip 204 may be configured to abut an interior surface of the mainline pipe. In some embodiments, outlet pipe 104 may protrude past first lip 204 and into the interior region of the mainline pipe. In other embodiments, outlet pipe 104 may remain within first sleeve 202, regardless of whether outlet pipe 104 extends into the interior region of the mainline pipe. In some embodiments, first lip 204 may comprise a thickness in the range of about ⅛ inches to about ½ inches. For example, first lip 204 may comprise a thickness of about ¼ inches. In other embodiments, as shown in FIG. 2A, first lip 204 may comprise rounded edges. Accordingly, in some embodiments, first lip 204 of first sleeve 202 may be configured to substantially conform to a contour of the interior surface of a mainline pipe. Accordingly, first lip 204 may comprise a curvature that substantially corresponds to a curvature of the interior surface of the mainline pipe. For example, first lip 204 may conform to the inner radius of the mainline pipe such that there is a relatively small protrusion into the interior region of the mainline pipe. In some embodiments, for example, first lip 204 may protrude into the interior region by no more than about ¼ inches to about ¾ inches in thickness. In some embodiments, first lip 204 may protrude into the interior region by no more than about ½ inches to about ¾ inches in thickness. By way of example, first lip 204 may comprise a radius of curvature in the range of about 0.05 to about 0.2 inches. For example, first lip 204 may comprise a radius of curvature of about 0.2 inches.

As shown in FIGS. 2A-2C, a second sleeve 206 may be disposed on first sleeve 202. Second sleeve 206 may be made of or may comprise materials, such as styrene-butadiene rubber (SBR), ethylene propylene diene monomer (EDPM) rubber, or Nitrile rubber. In some embodiments, second sleeve 206 may be made of the same material as first sleeve 202. In other embodiments, second sleeve 206 may be made of a material that is different from the material used to make first sleeve 202. In some embodiments, second sleeve 206 may be sized to accommodate first sleeve 202. For example, first sleeve 202 may comprise an outer diameter in the range of about 4 inches to about 8 inches, and second sleeve 206 may be sized to accommodate first sleeve 202 having a dimension of about 4 inches to about 8 inches in outer diameter. By way of example, second sleeve 206 may comprise an outer diameter in the range of about 6 inches to about 7 inches. Second sleeve 206 may also comprise a wall thickness in the range of about ⅛ inches to about ⅝ inches. For example, second sleeve 206 may comprise a wall thickness of about 0.5 inches. Additionally, or alternatively, second sleeve 206 may comprise a length in the range of about 5 inches to about 10 inches. For example, second sleeve 206 may comprise a length in the range of about 4 inches to about 6 inches.

In some embodiments, an inner diameter of second sleeve 206 may be greater than an outer diameter of first sleeve 202. Accordingly, when second sleeve 206 is disposed on first sleeve 202 and covers a portion of first sleeve 202, there may be a gap in the range of about 0.0001 inches to about 0.5 inches between the internal surface of second sleeve 206 and the exterior surface of first sleeve 202. For example, the gap between the internal surface of second sleeve 206 and the exterior surface of first sleeve 202 may be about 0.1 inches. In some embodiments, additional materials may be used to facilitate sliding first sleeve 202 over outlet pipe 104. For example, soap or other solutions may be used to facilitate sliding second sleeve 206 over first sleeve 202. In other embodiments, one or more materials may be used to facilitate securing second sleeve 206 to first sleeve 202. For example, a pipe lubricant or other types of lubricants may be disposed between first sleeve 202 and second sleeve 206 in order to facilitate securing second sleeve 206 to first sleeve 202. In yet another embodiment, second sleeve 206 may be secured to outlet pipe 104 by mechanical means. For example, a fastener may be used to secure second sleeve 206 to outlet pipe 104. In some embodiments, a fastener, such as a non-adjustable band, an adjustable band, a ratcheting band, a zip tie, a clinch band, or any combination thereof may be used to secure second sleeve 206 to outlet pipe 104.

As shown in FIG. 2B, in some embodiments, second sleeve 206 may comprise one or more recesses. For example, an exterior surface of second sleeve 206 may comprise at least one recess 210. Recess 210 may be configured to accommodate at least a portion of a fastener, such as a non-adjustable band, an adjustable band, a ratcheting band, a zip tie, a clinch band, or any combination thereof. Accordingly, recess 210 may be configured to secure a fastener onto second sleeve 206 such that second sleeve 206 and/or first sleeve 202 can be securely fastened onto outlet pipe 104. Each recess 210 may be sized to accommodate the fastener (not shown). For example, each recess 210 may comprise a width in the range of about 0.2 inches to about 1 inch. By way of example, each recess 210 may comprise a width in the range of about 0.5 inches to about 0.7 inches. Additionally, or alternatively, recesses 210 may be spaced apart from each other in the range of about 0.2 inches to about 1 inch. By way of example, recesses 210 may be spaced apart from each other in the range of about 0.5 inches to about 0.7 inches. In some embodiments, recesses 210 may be formed along an entire length of second sleeve 206. In other embodiments, recesses 210 may be formed only along a portion of the length of second sleeve 206.

In some embodiments, second sleeve 206 may further comprise a second lip 208 at a proximal end of second sleeve 206. When second sleeve 206 is disposed on first sleeve 202 and outlet pipe 104 and when outlet pipe 104 is connected to a mainline pipe, such as mainline pipe 102 of FIG. 1, second lip 208 may be configured to abut an exterior surface of the mainline pipe. In some embodiments, second lip 208 may comprise a thickness in the range of about ⅛ inches to about ½ inches. For example, second lip 208 may comprise a thickness of about ¼ inches. In other embodiments, as shown in FIG. 2A, second lip 208 may comprise rounded edges. Accordingly, in some embodiments, second lip 208 of second sleeve 206 may be configured to substantially conform to a contour of the exterior surface of a mainline pipe. Accordingly, second lip 208 may comprise a curvature that substantially corresponds to a curvature of the exterior surface of the mainline pipe. For example, second lip 208 may conform to the outer radius of the mainline pipe such that there is a relatively small protrusion on the exterior surface of the mainline pipe. In some embodiments, for example, second lip 208 may protrude from the exterior surface of the mainline pipe by no more than about ¼ inches to about ¾ inches in thickness. In some embodiments, second lip 208 may protrude from the exterior surface of the mainline pipe by no more than about ½ inches to about ¾ inches in thickness. In some embodiments, second lip 208 may comprise a radius of curvature in the range of about 0.05 to about 0.2 inches. For example, second lip 208 may comprise a radius of curvature of about 0.2 inches. In some embodiments, a sealant may be disposed between the exterior surface of the mainline pipe and second sleeve 206. Sealant may comprise, for example, silicone-based sealant, epoxy, or other similar materials. Sealant may facilitate ensuring a tight seal between the exterior surface of the mainline pipe and second sleeve 206 to prevent, for example, leakage of surface drainage or fluid through the pipes.

In some embodiments, first sleeve 202 and second sleeve 206 may need to be secured so as to prevent movement between first sleeve 202 and second sleeve 206. In some embodiments, movement between first sleeve 202 and second sleeve 206 may be inhibited or prevented by providing one or more ridges on the exterior surface of first sleeve 202 and/or interior surface of second sleeve 206. For example, referring now to FIGS. 3A and 3B, second sleeve 206 may comprise a plurality of ridges 212 on an interior surface of second sleeve 206. Additionally, or alternatively, referring now to FIGS. 4A and 4B, first sleeve 202 may comprise a plurality of ridges 214 on an exterior surface of first sleeve 202. In some embodiments, first sleeve 202 and/or second sleeve 206 may comprise between about 20 ridges to about 100 ridges. For example, first sleeve 202 and/or second sleeve 206 may comprise about 40 ridges. Ridges 212 and/or ridges 214 may extend along an entire length of second sleeve 206 and first sleeve 202, respectively. In other embodiments, ridges 212 and/or ridges 214 may extend only a portion of the length of second sleeve 206 and first sleeve 202, respectively. For example, ridges 212 and/or ridges 214 may extend in the range of about 2 inches to about 5 inches along the length of second sleeve 206 and first sleeve 202, respectively. In some embodiments, ridges 212 and/or ridges 214 may comprise a width in the range of about 0.01 inches to about 0.2 inches and a height in the range of about 0.01 inches to about 0.1 inches. For example, ridges 212 and/or ridges 214 may comprise a width in the range of about 0.02 inches to about 0.05 inches and a height of about 0.03 inches to about 0.06 inches.

Ridges 212 of second sleeve 206 and ridges 214 of first sleeve 202 may comprise a plurality of lateral ridges and/or a plurality of longitudinal ridges. For example, as illustrated in FIGS. 3A, 3B, 4A, and 4B, ridges 212 and ridges 214 may comprise a plurality of lateral ridges extending substantially circumferentially around the interior surface of second sleeve 206 and exterior surface of first sleeve 202, respectively. In other embodiments, ridges 212 and ridges 214 may comprise a plurality of lateral ridges extending at least partially around the interior surface of second sleeve 206 and exterior surface of first sleeve 202, respectively. In yet another embodiment, ridges 212 and ridges 214 may comprise a plurality of longitudinal ridges extending across at least a portion of the length of second sleeve 206 on its interior surface and first sleeve 202 on its exterior surface, respectively. In some embodiments, ridges 212 may comprise a plurality of lateral ridges, while ridges 214 may comprise a plurality of longitudinal ridges, or vice versa.

Referring back to FIGS. 3A, 3B, 4A, and 4B, ridges 212 of second sleeve 206 and ridges 214 of first sleeve 202 may comprise a plurality of lateral ridges extending substantially circumferentially around the exterior surface of second sleeve 206 and the interior surface of first sleeve 202. Accordingly, ridges 212 and ridges 214 may be configured to interact with each other to inhibit movement along a longitudinal axis between first sleeve 202 and second sleeve 206 when second sleeve 206 is disposed on first sleeve 202. Additionally, or alternatively, when ridges 212 and ridges 214 comprise a plurality of longitudinal ridges extending substantially longitudinally along the interior surface of second sleeve 206 and the exterior surface of first sleeve 202, respectively, ridges 212 and 214 may be configured to interact with each other to inhibit movement along a vertical axis between first sleeve 202 and second sleeve 206 when second sleeve 206 is disposed on first sleeve 202.

Figure 4B:
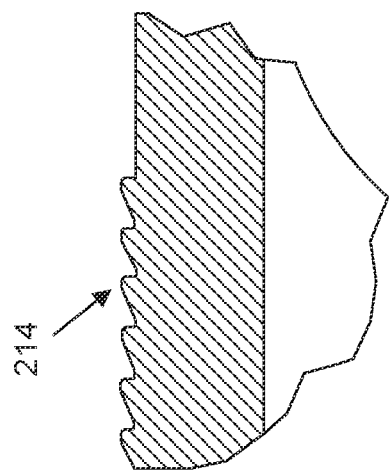
FIG. 4B is another illustration of a portion of the exemplary inner sleeve of FIG. 4A, consistent with the embodiments of the present disclosure.
Figure 4A:
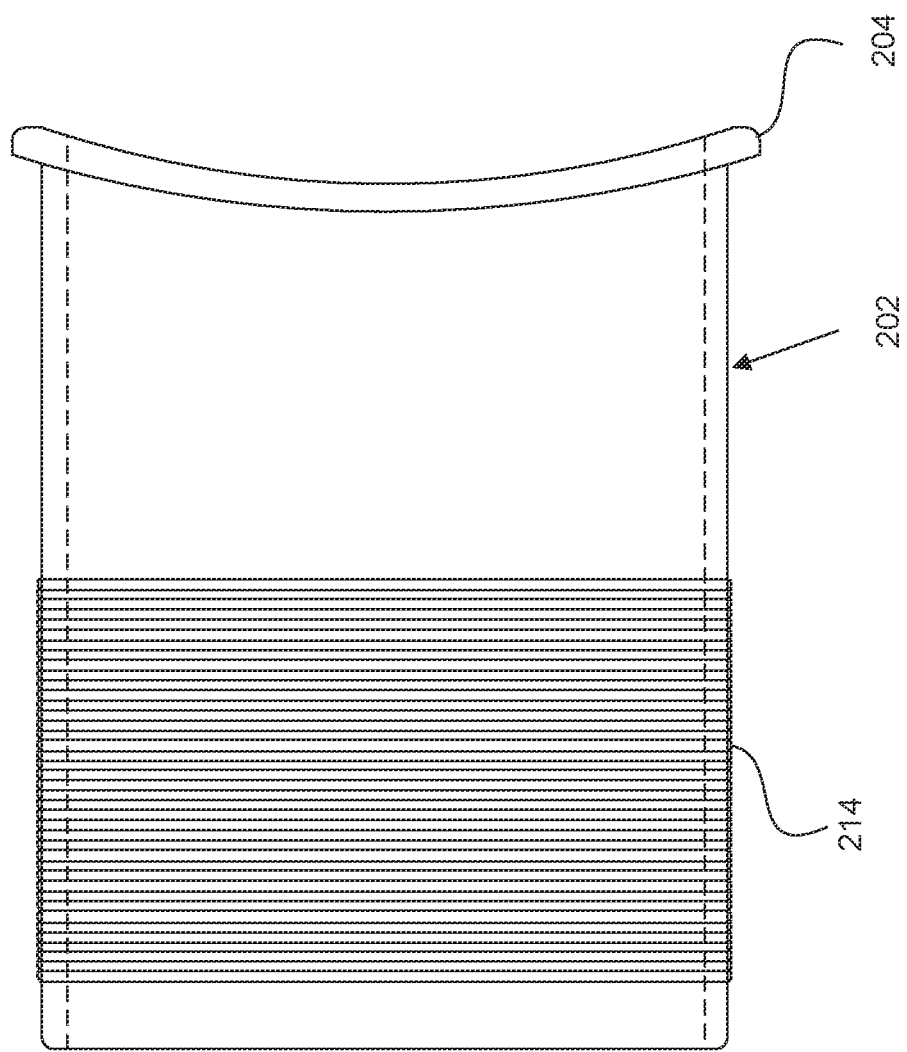
FIG. 4A is an illustration of an exemplary inner sleeve, consistent with the embodiments of the present disclosure.

In some embodiments, ridges 212 and/or ridges 214 may be rounded, angled, or any combination thereof. For example, as illustrated in FIGS. 3B and 4B, ridges 212 and/or ridges 214 may be angled and triangularly-shaped. Additionally, or alternatively, ridges 212 and/or ridges 214 may be slightly rounded. By way of example, ridges 212 and/or ridges 214 may comprise a radius of curvature in the range of about 0.002 inches to about 0.02 inches at the base and a radius of curvature in the range of about 0.01 inches to about 0.05 inches at the tip. For example, ridges 212 and/or ridges 214 may comprise a radius of curvature of about 0.01 inches at the base and a radius of curvature of about 0.02 inches at the tip. In some embodiments, ridges 212 and ridges 214 may comprise similar shapes. In other embodiments, ridges 212 and ridges 214 may comprise different shapes. For example, ridges 212 may be angled, and ridges 214 may be rounded, or vice versa. In some embodiments, ridges 212 and/or ridges 214 may comprise a height in the range of about 0.01 inches to about 0.1 inches. For example, ridges 212 and/or ridges 214 may comprise a height in the range of about 0.03 inches to about 0.06 inches. In other embodiments, ridges 212 and/or ridges 214 may comprise a width in the range of about 0.01 inches to about 0.2 inches. For example, ridges 212 and/or ridges 214 may comprise a width in the range of about 0.02 inches to about 0.05 inches. Ridges 212 and/or ridges 214 may be spaced apart from each other. By way of example, ridges 212 and/or ridges 214 may be spaced apart from each other by about 0.05 inches to about 0.2 inches. For example, ridges 212 and/or ridges 214 may be spaced apart from each other by about 0.08 inches to about 0.1 inches. The dimensions and configurations of first sleeve 202 and second sleeve 206 may be adjustable such that first sleeve 202 and second sleeve 206 can accommodate pipes of different diameters, sizes, and wall thicknesses.

According to another embodiment of the present disclosure, a method for installing a system for connecting a mainline pipe and an outlet pipe is provided. First, the method may comprise forming an aperture in a sidewall of a mainline pipe, such as mainline pipe 102 of FIG. 1. The aperture may be formed, for example, using a hole saw or any other coring method. After the aperture is formed, first sleeve 202 may be inserted through the aperture in the mainline pipe and first sleeve 202 may be aligned such that lip 204 of first sleeve 202 is positioned in an interior region of the mainline pipe. In some embodiments, first sleeve 202 may be inserted through the aperture by folding first sleeve 202 along a longitudinal dimension. In some embodiments, and as discussed above, first lip 204 of first sleeve 202 may be configured to substantially conform to a contour of the interior surface of the mainline pipe surrounding the aperture. Accordingly, first lip 204 may comprise a curvature that substantially corresponds to a curvature of the interior surface of the mainline pipe surrounding the aperture. For example, first lip 204 may conform to the inner radius of the mainline pipe such that there is a relatively small protrusion into the interior region of the mainline pipe.

Once first sleeve 202 is inserted in the mainline pipe, second sleeve 206 may be positioned over outlet pipe 104, and outlet pipe 104 may be inserted into first sleeve 202 such that a proximal end of outlet pipe 104 is positioned in the interior region of the mainline pipe, such as mainline pipe 102 of FIG. 1. Once outlet pipe 104 is inserted into first sleeve 202, second sleeve 206 positioned over outlet pipe 104 may be slid or positioned over first sleeve 202 such that second sleeve 206 is disposed on first sleeve 202. As discussed above, lip 208 of second sleeve 206 may be configured to abut the exterior surface of the mainline pipe surrounding the aperture once second sleeve 206 is disposed on first sleeve 202. In some embodiments, first sleeve 202 and second sleeve 206 may be secured to each other, as well as to outlet pipe 104, by a fastener. For example, a fastener, such as a non-adjustable band, an adjustable band, a ratcheting band, a zip tie, a clinch band, or any combination thereof may be used to secure second sleeve 206 and first sleeve 202 to each other and to outlet pipe 104. The fastener may be accommodated in one or more recesses 210 on second sleeve 206 and may extend circumferentially around second sleeve 206.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for connecting a mainline pipe with an outlet pipe, the system comprising:
    the outlet pipe configured to be coupled to the mainline pipe near a proximal end of the outlet pipe;
    a first sleeve disposed on an exterior surface of the outlet pipe and comprising a first lip at a proximal end of the first sleeve;
    a second sleeve disposed on the first sleeve, comprising:
        a second lip at a proximal end of the second sleeve; and
        a plurality of recesses extending circumferentially around an outer surface of the second sleeve and spaced apart along an entire axial length of the second sleeve; and
    a gap formed between an inner diameter of the second sleeve and an outer diameter of the first sleeve when the second sleeve is disposed on the first sleeve,
    wherein the first lip of the first sleeve is configured to abut an interior surface of the mainline pipe and the first lip comprises a curvature that corresponds to a curvature of the interior surface of the mainline pipe,
    wherein the second lip of the second sleeve is configured to abut an exterior surface of the mainline pipe, and
    wherein the outlet pipe is configured to extend past both ends of the first sleeve.

2. The system of claim 1, wherein:
    the plurality of recesses are configured to accommodate at least a portion of a fastener.

3. The system of claim 2, wherein the fastener comprises at least one of a non-adjustable band, an adjustable band, a ratcheting band, a zip tie, or a clinch band.

4. The system of claim 1, wherein:
    an exterior surface of the first sleeve comprises a plurality of ridges,
    an interior surface of the second sleeve comprises a plurality of ridges, and
    the ridges of the first sleeve and the ridges of the second sleeve are configured to interact with each other to inhibit movement between the first sleeve and the second sleeve.

5. The system of claim 4, wherein the plurality of ridges on the exterior surface of the first sleeve and the plurality of ridges on the interior surface of the second sleeve comprise at least one of lateral ridges extending circumferentially around the exterior surface of the first sleeve and the interior surface of the second sleeve or longitudinal ridges extending longitudinally along the exterior surface of the first sleeve and the interior surface of the second sleeve.

6. The system of claim 4, wherein the ridges of the first sleeve and the ridges of the second sleeve are configured to interact with each other to inhibit movement along at least one of a longitudinal axis or a vertical axis between the first sleeve and the second sleeve.

7. The system of claim 1, wherein the second lip comprises a curvature that corresponds to a curvature of the exterior surface of the mainline pipe.

8. The system of claim 1, wherein the gap is 0.1 inches wide.

9. The system of claim 1, further comprising a gap between an interior surface of the first sleeve and the exterior surface of the outlet pipe when the first sleeve is disposed on the exterior surface of the outlet pipe.

10. The system of claim 1, wherein each of the plurality of recesses comprises a width of 0.2 inches to 1 inch.

11. The system of claim 1, wherein each of the plurality of recesses is spaced apart along the length of the second sleeve by 0.2 inches to 1 inch.

12. A system for connecting a mainline pipe with an outlet pipe, the system comprising:

the outlet pipe configured to be coupled to the mainline pipe near a proximal end of the outlet pipe;

a first sleeve disposed on an exterior surface of the outlet pipe and comprising a first lip at a proximal end of the first sleeve, the first lip being configured to abut an interior surface of the mainline pipe, and the first lip comprises a curvature that corresponds to a curvature of the interior surface of the mainline pipe;

a second sleeve disposed on the first sleeve, comprising:

a second lip at a proximal end of the second sleeve, the second lip being configured to abut an exterior surface of the mainline pipe; and a plurality of recesses extending circumferentially around an outer surface of the second sleeve and spaced apart along an entire axial length of the second sleeve;

a gap formed between an inner diameter of the second sleeve and an outer diameter of the first sleeve when the second sleeve is disposed on the first sleeve, and wherein the outlet pipe is configured to extend past both ends of the first sleeve, wherein:

an exterior surface of the first sleeve comprises a plurality of ridges, an interior surface of the second sleeve comprises a plurality of ridges, and the ridges of the first sleeve and the ridges of the second sleeve are configured to interact with each other to inhibit movement between the first sleeve and the second sleeve.

13. The system of claim 12, wherein the plurality of ridges on the exterior surface of the first sleeve and the plurality of ridges on the interior surface of the second sleeve comprise at least one of lateral ridges extending circumferentially around the exterior surface of the first sleeve and the interior surface of the second sleeve or longitudinal ridges extending longitudinally along the exterior surface of the first sleeve and the interior surface of the second sleeve.

14. The system of claim 12, wherein the ridges of the first sleeve and the ridges of the second sleeve are configured to interact with each other to inhibit movement along at least one of a longitudinal axis or a vertical axis between the first sleeve and the second sleeve.

15. The system of claim 12, wherein the second lip comprises a curvature that corresponds to a curvature of the exterior surface of the mainline pipe.

16. The system of claim 12, further comprising a gap between an interior surface of the first sleeve and the exterior surface of the outlet pipe when the first sleeve is disposed on the exterior surface of the outlet pipe.

17. The system of claim 12, wherein:

the plurality of recesses are configured to accommodate at least a portion of a fastener; and the fastener comprises at least one of a non-adjustable band, an adjustable band, a ratcheting band, a zip tie, or a clinch band.

18. The system of claim 12, wherein each of the plurality of recesses comprises a width of 0.2 inches to 1 inch.

19. The system of claim 12, wherein each of the plurality of recesses is spaced apart along the length of the second sleeve by 0.2 inches to 1 inch.

* * * * *